Jan. 29, 1957 K. D. HAMILTON 2,779,311
BIRD FEEDER WITH PERCH SUPPORT THEREFOR
Filed Dec. 12, 1955
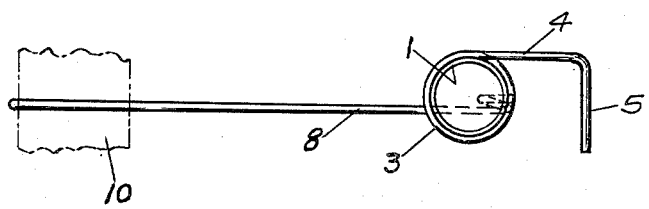
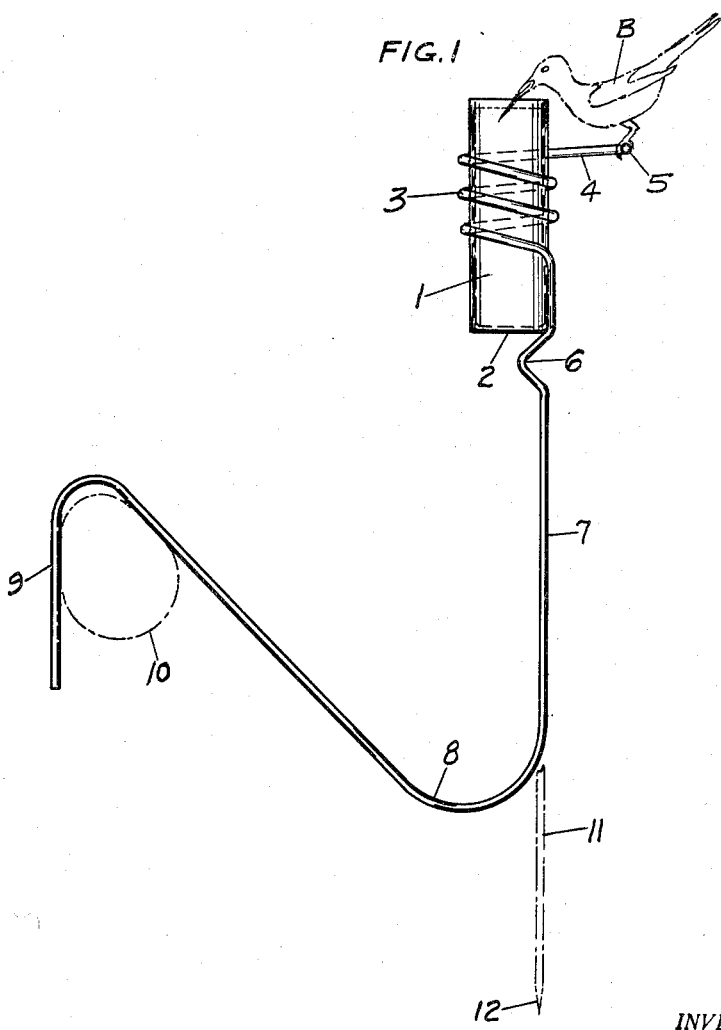
INVENTOR.
KENNETH D. HAMILTON
BY
A. D. T. Libby
ATTORNEY

United States Patent Office 2,779,311
Patented Jan. 29, 1957

2,779,311

BIRD FEEDER WITH PERCH SUPPORT THEREFOR

Kenneth D. Hamilton, Cedar Grove, N. J.

Application December 12, 1955, Serial No. 552,425

4 Claims. (Cl. 119—51)

This invention relates to a feeder for birds, such as hummingbirds, sparrows, and other small types. Throughout the years past, certain types of bird feeding devices have been proposed, but the object of my present invention is to provide a bird feeder that is much simpler and less expensive to make, yet one that can be easily and cheaply manufactured, but much more efficient in accomplishing the results than the prior art devices with many of which I am familiar, and after a thorough study and experiments, I have arrived at the structure shown in the annexed drawing and set forth in the following specification, wherein Figure 1 is a side view of the bird feeding device in one position of use.

Figure 2 is a view looking down on the top of Figure 1 without the bird.

In the drawing 1, is a tube which may be of any satisfactory material, but for most uses I prefer the material of the tube to be of glass, having a closed bottom which may be molded into tube 1; or the tube unit may be constructed by cutting up, so to speak, a long glass tube the right lengths, and then inserting a stopper or plug in the bottom end. Around the tube 1 is positioned a holder 3 which may be composed of one or more turns that closely fit around the tube. At the upper end, the last convolution extends outwardly at 4 and terminates in an extension 5, which acts as a seat or perch for a bird B, which may be a hummingbird or some other type of a small bird. At the bottom end 2 of tube 1, the wire support member is preferably bent inwardly at 6, so as to engage this stop end 2 of the feeder device, then the support wire extends downwardly at 7 and may have a bent end 8 and a further bend 9, formed so as to engage some supporting device, such as, the limb of a tree or part of a fence, as indicated by the broken line 10. In some cases, the rod may extend straight downwardly as indicated by the broken line 11, which preferably terminates at a sharp point 12, whereby the support rod 7 may be pushed into the ground or the equivalent. While I prefer to make the support wire 7 out of aluminum, it can be made with any other suitable metal, preferably rustproof, so that the device may give long service. In use, the tube 1 is filled with suitable food or liquid which the birds like, and as they come to the structure, they see the perch or seat 5 and light thereon, and help themselves to whatever is in the tube 1, and I have found that not only hummingbirds, but other types of birds enjoy this feeding construction.

Having thus described my invention, what I claim is:

1. A bird feeder comprising a tube of suitable material to carry bird feed, the tube having a closed bottom, a single one piece support for the tube comprising a coil of at least one turn of suitable material fitting tightly around the tube, the coil having its end adjacent the open end of the tube extending away from said open end to form a seat for a bird while the opposite end of the coil extends inwardly of the coil to form a bottom support for the tube and the coil then terminating in an elongated support.

2. A bird feeder as defined in claim 1 further characterized in that the seat for the bird extends in a direction at right angles to the axis of the tube and at a transverse distance at least as great as the diameter of the tube.

3. A bird feeder as defined in claim 1 further characterized in that the coil preferably has a plurality of turns while the extending end from the closed end of the tube is of a length such that it may be made to cooperate with any support.

4. A bird feeder as defined in claim 1 further characterized in that the tube is of glass while the support is of suitable rust resistant wire that may be formed to give the best support for the tube and bird.

References Cited in the file of this patent

UNITED STATES PATENTS

| | | |
|---|---|---|
| 1,433,420 | Seidts | Oct. 24, 1922 |
| 1,899,508 | Klein | Feb. 28, 1933 |
| 2,520,818 | Terry | Aug. 29, 1950 |
| 2,558,768 | McCormick | July 3, 1951 |

OTHER REFERENCES

Popular Mechanics, December 1946.